(12) United States Patent
Robinson

(10) Patent No.: US 8,386,598 B2
(45) Date of Patent: Feb. 26, 2013

(54) NETWORK MONITORING BY USING PACKET HEADER ANALYSIS

(75) Inventor: Stephen Robinson, Hertfordshire (GB)

(73) Assignee: McAfee, Inc., Santa Clara, CA (US)

( * ) Notice: Subject to any disclaimer, the term of this patent is extended or adjusted under 35 U.S.C. 154(b) by 579 days.

(21) Appl. No.: 12/373,117

(22) PCT Filed: Jul. 19, 2007

(86) PCT No.: PCT/GB2007/050422
§ 371 (c)(1),
(2), (4) Date: Nov. 6, 2009

(87) PCT Pub. No.: WO2008/009994
PCT Pub. Date: Jan. 24, 2008

(65) Prior Publication Data
US 2010/0057903 A1  Mar. 4, 2010

(30) Foreign Application Priority Data
Jul. 19, 2006  (GB) .................................. 0614334.1

(51) Int. Cl.
*G06F 15/173* (2006.01)
(52) U.S. Cl. ........ 709/224; 709/223; 709/225; 707/821; 707/822; 707/823; 707/824; 707/825; 707/826; 707/827; 707/828; 707/829; 707/830; 707/831

(58) Field of Classification Search .................. None
See application file for complete search history.

(56) References Cited

U.S. PATENT DOCUMENTS

| | | | | |
|---|---|---|---|---|
| 5,701,463 A | * | 12/1997 | Malcolm | 707/758 |
| 5,848,418 A | * | 12/1998 | de Souza et al. | 1/1 |
| 5,960,170 A | * | 9/1999 | Chen et al. | 714/38.14 |
| 5,983,348 A | * | 11/1999 | Ji | 726/13 |
| 6,144,934 A | * | 11/2000 | Stockwell et al. | 704/1 |
| 6,167,520 A | * | 12/2000 | Touboul | 726/23 |
| 6,711,607 B1 | | 3/2004 | Goyal | |
| 7,103,602 B2 | * | 9/2006 | Black et al. | 707/825 |
| 7,313,824 B1 | * | 12/2007 | Bala et al. | 726/27 |
| 7,356,679 B1 | * | 4/2008 | Le et al. | 713/1 |
| 7,376,842 B1 | * | 5/2008 | Hursey | 713/188 |
| 7,395,306 B1 | | 7/2008 | Lai et al. | |
| 7,397,959 B1 | * | 7/2008 | Volkoff et al. | 382/233 |
| 7,640,308 B2 | * | 12/2009 | Antonoff et al. | 709/206 |

(Continued)

FOREIGN PATENT DOCUMENTS
EP  1434146  6/2004

OTHER PUBLICATIONS

International Search Report dated Oct. 8, 2007, in PCT application.

(Continued)

*Primary Examiner* — Backhean Tiv
(74) *Attorney, Agent, or Firm* — Wong, Cabello, Lutch, Rutherford & Brucculeri, LLP

(57) ABSTRACT

A computer method and a system for detecting the file type of an electronic file, the method including the steps of: (a) using a predetermined number of bytes at the beginning of the file to create a list of probable file types; (b) testing the file against a detection rule for each file type in the list until a match is found; if no match is found (c) testing the file against other known detection rules for file types to find a match.

12 Claims, 3 Drawing Sheets

U.S. PATENT DOCUMENTS

| | | | |
|---|---|---|---|
| 7,748,036 B2 * | 6/2010 | Speirs et al. | 726/22 |
| 7,797,411 B1 | 9/2010 | Guruswamy et al. | |
| 2002/0143797 A1 | 10/2002 | Zhang | |
| 2003/0026251 A1 | 2/2003 | Morris et al. | |
| 2003/0217184 A1 | 11/2003 | Nair | |
| 2005/0010388 A1 | 1/2005 | Bagchi et al. | |
| 2005/0015381 A1 * | 1/2005 | Clifford et al. | 707/100 |
| 2005/0122970 A1 | 6/2005 | Tripathi et al. | |
| 2006/0002386 A1 | 1/2006 | Yik et al. | |
| 2006/0149968 A1 * | 7/2006 | Edery et al. | 713/181 |
| 2006/0271823 A1 | 11/2006 | Smith | |
| 2007/0074272 A1 | 3/2007 | Watanabe | |
| 2007/0226360 A1 | 9/2007 | Gupta et al. | |
| 2008/0077995 A1 * | 3/2008 | Curnyn | 726/27 |
| 2008/0295174 A1 * | 11/2008 | Fahmy et al. | 726/23 |
| 2009/0207750 A1 * | 8/2009 | Robinson | 370/252 |
| 2010/0070543 A1 * | 3/2010 | Backa | 707/821 |

OTHER PUBLICATIONS

Office Action dated Sep. 23, 2011 regarding U.S. Appl. No. 12/373,129.

* cited by examiner

NETWORK MONITORING BY USING PACKET HEADER ANALYSIS

BACKGROUND

The present invention relates to a system and a method for detecting the file type of electronic files particularly in monitoring computer networks.

Network monitoring can be used for many purposes, including analysing network problems, detecting network intrusion attempts, gaining information for effecting a network intrusion, monitoring network usage, gathering and reporting network statistics, filtering suspect content from network traffic, reverse-engineering protocols used over a network, and debugging client/server communications.

Known network monitoring systems include packet "sniffers" (also known as network or protocol analyzers or Ethernet sniffers) which can intercept and log data packets passing over a digital network or part of a network, and can be set to capture or copy packets that are intended for a single machine on a network or, if set to "promiscuous mode", a packet sniffer is also capable of capturing or copying all data packets traversing a network regardless of their intended destination.

A problem facing known network monitoring systems is that the volume of network traffic in local and wide area networks is increasing at a dramatic rate, due to increased sizes of networks combined with the requirement for networks to perform increasingly varied tasks, and increases in available bandwidth and speed of the networks. Hence known systems cannot process data packets at the rate at which they are transmitted and tend to store raw data as it passes the packet sniffer. The data is then processed at the best possible rate, and periods of low network use, such as at night, can be used to "catch up" with the data processing.

There are several disadvantages of processing the data at a slower speed than data is received. For example it is necessary to provide large data storage capacity for the raw data, it is not possible to catch up if the network is used at a high rate continuously, and also it is not possible to run any real-time dependent monitoring tasks.

SUMMARY

The present invention seeks to provide a method and a system for efficient and effective automatic detection of the file type of an electronic file.

Preferably the system performs in real time and handles data packets sequentially one at a time.

The system of the invention is faster than known systems.

According to one aspect of the invention there is provided a method for detecting the file type of an electronic file, the method comprising the steps of: (a) using a predetermined number of bytes at the beginning of the file to create a list of probable file types; (b) testing the file against a detection rule for each file type in the list until a match is found; if no match is found (c) testing the file against other known detection rules that aren't in the type-trie for file types to find a match.

Preferably a type-time data structure is used wherein each node has an extra child for a wild-card character and each node contains a pointer to its parent node.

Advantageously when matching data against a type-trie each node may offer two different paths to follow, one for the normal child node and one for the wild-card child, and the normal child is always visited in preference to the wild-card child.

If while performing the match a mismatch occurs then the parent node pointers are preferably followed until a parent node is found that has a wild-card child. The wild-card child is then visited and the process is repeated until a match occurs or there are no more parent nodes with wild-card children.

Because not every data type can be uniquely identified by the first few bytes of data, further detection rules may be required to pinpoint the correct data type.

If none of the possible data types in the list are correct, then a check may be made to see if there are any untried detection rules for data types not listed in the data type list. If other detection rules are available then the data is preferably tested against each rule in turn, checking for matches after each test.

If, after every available detection rule has been tried, no match has been found, then the file type is preferably set to "unknown". It is possible to check for a file extension in the data but if a detectable type of file extension is found in the data at this stage then since it cannot be the declared type, the file type is marked "unknown". If a non-detectable file type is revealed by the extension then the file type for the data is preferably set to that type. If no file extension can be located in the data, then the file type is in any case set to "unknown".

The detection rules are preferably compiled into an intermediate state that can be quickly interpreted to test them against incoming data.

Other aspects of the invention include corresponding apparatus, computer programs and computer program media.

BRIEF DESCRIPTION OF THE DRAWINGS

The present invention will now be described, by way of example, with reference to the accompanying drawings, in which.

DETAILED DESCRIPTION

Figure 1:
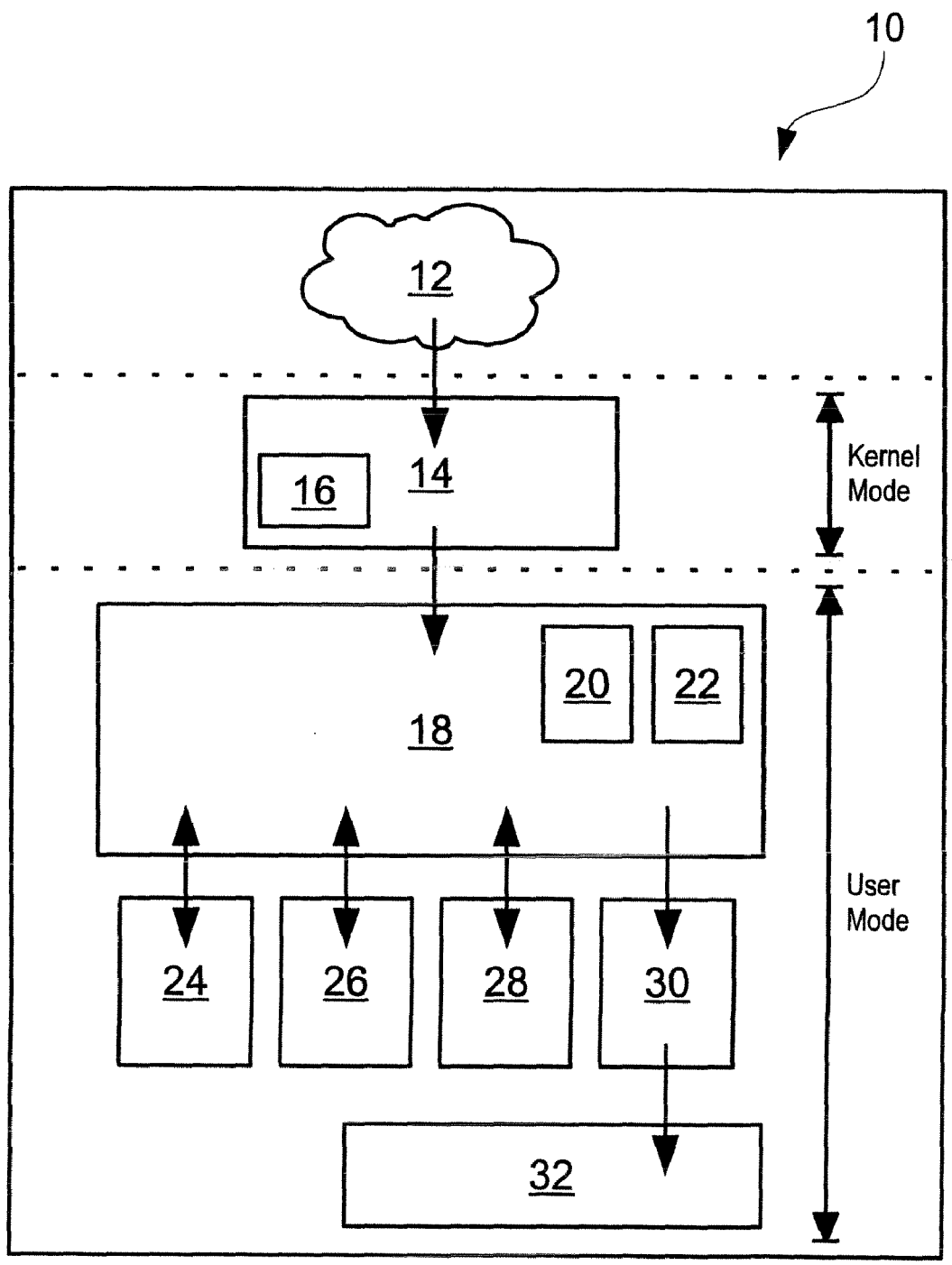
FIG. 1 is a block diagram illustrating a data traffic monitoring system which can be used in the file type detection method of the present invention.

FIG. 1 shows a monitoring system 10 for data traffic on a network 12, and comprises a packet capture driver 14, for capturing raw packet data from the network 12, a control engine 18 arranged to receive raw data packets captured from the network 12, a set of protocol and/or object modules 24; 26; 28, which identity and analyse the content of the captured data packets, an application 30, for processing the content from the data packets, and storage means 32 for storing the processed data.

The packet capture driver 14 comprises a packet buffer 16. The control engine 18 comprises a packet buffer 20 and a stream list 22.

Figure 2:
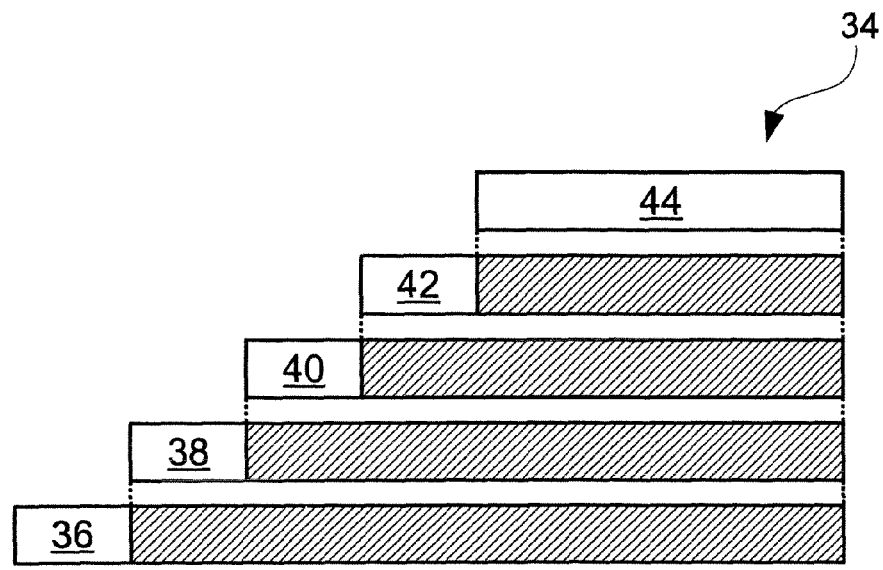
FIG. 2 is a schematic illustration of the structure of a typical data packet in a local area network which can be monitored by the system of FIG. 1.

FIG. 2 illustrates the structure of one example of an Ethernet data packet 34 which will be used in the following example to explain the operation of the monitoring system of FIG. 1.

The data packet 34 comprises an Ethernet Protocol layer 36, an Internet Protocol (IP) layer 38, a Transmission Control Protocol (TCP) layer 40, a Hyper Text Transfer Protocol (HTTP) layer 42, and an application byte stream 44.

The control engine 18 is installed on a host computer connected to one or more networks 12 to be monitored. When the control engine 18 is initialised it searches for protocol modules such as 24, 26, 28 within a specified directory of the host computer. The available protocol modules 24, 26, 28 then register with the control engine 18, notifying the control engine 18 as to the type of data (protocol or object type) they are capable of (or are willing to try) dissecting/decoding and, as appropriate, the data transfer protocol or object type they are adapted to decode. For example, in the system of FIG. 1 there is an Internet Protocol (IP) module 24, a Transmission Control Protocol (TCP) module 26, and a HyperText Transfer Protocol (HTTP) module 28. This notification of decodable protocols and/or objects for each module is interpreted by the control engine 18 as neither definitive nor exhaustive. The notification allows the control engine 18 to decide which modules should be given first chance to accept or reject the data. If the data is rejected by one protocol module then it is passed to each of the other available protocol modules in turn until either a module accepts the data, or there are no more modules available. The protocol modules 24, 26, 28 effectively register commands with the control engine 18 which act as filters allowing for the selection of specific data that can be easily and reliably identified by the module, for example by protocol numbers and/or the contents of packet headers.

The control engine 18 receives data packets from the packet capture driver 14 which provides an interface between the host operating system's network subsystem and the control engine 18. The packet capture driver 14 includes means of identifying network adapters present on the host machine and means of retrieving details about the network adapters such as a name, hardware address, media type, and speed. The packet capture driver 14 also provides means for selecting which network adapter(s) should be used for capturing packets and means for modifying settings for individual network adapters, such as setting an adapter to promiscuous mode.

The packet buffer 16 of the packet capture driver 14 is used to store incoming data packets copied from the selected network data traffic. The packet buffer 16 stores all of the data packets until they have either been successfully decoded and retrieved by an application 30, or the packet has been rejected by the system 10.

Raw data packets in the packet buffer 16 are not moved or modified in any way during the decoding process, thereby minimising processing overheads associated with such tasks. During the decoding process pointers to the data packets in the packet buffer 16 are passed as function variables between the packet capture driver 14, control engine 18, decoding modules 24; 26; 28, and the application 30.

The decoding process begins when the control engine 18 receives a pointer from the packet capture driver 14 pointing to a data packet 34 in the packet buffer 16. The control engine 18 examines the raw data packet 34 to determine the protocol of the lowest protocol layer in the packet 34 (the lowest layer in the protocol stack). The control engine 18 is programmed to understand the most common, ie lowest layer, transfer protocols. In the example shown in FIG. 2 the lowest protocol layer in the data packet 34 is the Ethernet Protocol (EP) layer 36.

Once the control engine 18 has determined the lowest protocol layer it then decodes that lowest layer to determine where the next protocol layer (in this example the IP layer 38) in the data packet 34 begins. The control engine 18 then creates a pointer to the start of this next layer 38. This decoding process does not physically modify the raw data packet 34 stored in the packet buffer 16.

The control engine 18 extracts the protocol identifier from the next layer 38 of the data packet 34 then, using the module registration data, determines which one, if any, of the available modules has notified the control engine 18 that it wants first chance to accept or reject data packets containing this identified protocol. In this example, the next lowest protocol layer is the Internet Protocol (IP) layer 38, and therefore the control engine 18 will select the IP module 24.

Once the IP module 24 has been determined as the next one to try, the control engine 18 sends a pointer to the selected protocol module 24 indicating the location of the raw data packet 34 in the packet buffer 16 and also an offset to enable the IP module 24 to locate the valid data for the second layer 38 within the packet 34. The IP module 24 will then examine the second protocol layer 38 within the data packet 34 and determine whether or not it can decode the protocol. If the second protocol layer 38 is successfully recognised by the IP protocol module 24, it will decode the second protocol layer 38 and determine where the valid data for the third protocol layer 40 in the data packet 34 begins and returns a pointer to the control engine 18. The pointer identifies the data packet 34 along with the offset of valid data for the third layer 40. The control engine 18 will then look at the third protocol layer 40 to determine a probable protocol type for the third layer 40.

The control engine 18 then uses the probable layer type to determine which module, if any, has indicated that it wants the first chance to accept or reject the data. In the illustrated example of a data structure given in FIG. 4, the next protocol layer is the TCP layer 40 which the TCP module 26 would have registered with the control engine 18 to receive first.

This process is repeated until either there are no more modules to decode the protocol layers in the data packet, or until there are no more layers, e.g. the application byte stream 44 in the data packet 34 is identified as part of a stream.

An aim of the decoding process described above is to be able to reconstruct the original data sent over the network. To achieve this aim it is desirable to decode a protocol layer that enables associated data packets to be grouped together and reconstructed into the original stream. The network monitoring system 10 may include one or more modules capable of identifying streamed data, for example the TCP module 26, and/or one or more modules arranged to reconstruct stream data, for example the HTTP module 28.

When a protocol module such as the TCP module 26 looks at the first data packet 34 of a stream of data from the control engine 18, the TCP module 26 will examine the data and decide if it recognises it. If the TCP module 26 successfully recognises and decodes the TCP layer 40 and finds the start of a stream, the TCP module 26 notifies the control engine 18 that the start of a stream has been detected. The control engine 18 then creates a pointer list 22 in memory, which is used to store pointers to packets identified as part of the stream while protocol type detection is taking place. The pointer list 22 enables the system 10 to continue sending one pointer between modules and the control engine 18 in later decoding stages.

The control engine 18 also creates two arrays, one for each direction (upload and download) that are used to concatenate the data from multiple packets. The data in these arrays is then passed to the modules while they are performing protocol detection so that the modules do not need to handle data that is spread across multiple packets. The two arrays and the packet pointer lists are stored only while protocol type detection is taking place and as soon as a module has accepted the stream, the control engine 18 passes all the packets in the pointer list to the module and the pointer list and arrays are destroyed.

The TCP module 26 then sends a pointer to the data packet 34 back to the control engine 18, along with the offset of valid data for the fourth layer 42 and an indication of the probable type of data in the fourth layer 42, which in the example data packet 34 is an HTTP stream layer. In addition, the module 26 sends the stream pointer to identify which stream the data packet is associated with, and also the direction the data is travelling.

When the control engine 18 receives the first packet of a stream (for example, when a TCP module 26 detects a stream and notifies the control engine 18), it looks up any modules registered for the data type supplied by the TCP module 26 and then it passes the data in the packet to the identified module, i.e. the HTTP module 28. The HTTP module 28 will then examine the data and decide whether or not it recognises it. The HTTP module 28 then notifies the control module 18 that either:

- a) The module is not yet able to make a conclusive decision as to the type of data in the stream, but the module wishes to continue to receive the data for this stream until it can make a decision.
- b) The module has identified the data and wishes to receive all other packets on this stream.
- c) The module has identified the data, and the module can decode the data, but the module does not want to receive any other packets on this stream.
- d) The module has decided that the data is not for it and it does not want to receive any other packets on this stream. This instructs the control engine 18 to allow other modules to detect the type of data in the packet(s).

For each stream, the control engine 18 maintains a separate stream list 22 for each direction (upload and download) and a pointer list containing pointers to each packet received so far. During the stream identification process, the control engine 18 will concatenate each new packet's data onto the appropriate stream list 22, thereby enabling each module access to the entire stream data received so far in a continuous array. If a module decides that, after inspecting several packets of a stream, it does not want to/cannot decode the stream, the control engine 18 can use the arrays and pointer list 22 to "replay" the packets containing the stream to other modules in the order that they were received so that other modules can inspect the packets. However once a module has accepted the stream, the packet pointers are removed from the list and the list and arrays are destroyed.

The stream pointer can be thought of as a number simply identifying which stream a packet belongs to. However a small amount of memory in the stream is also reserved to allow modules to store state information. For example a module can store information about what it is doing in the stream to aid it in handling the next packet.

There are certain situations where it is not possible to detect the type of data in a stream, for example where a connection simply transfers raw file data with no protocol headers or other identifying information (once a connection has been established). To allow for this, when a module registers for a stream-type data with the control engine 18 it can be set so that the module automatically accepts all streams matching a specified type (i.e. no detection of the type by the module).

Once a module, such as an HTTP module 28, positively identifies the data and informs the control engine 18 that it wishes to receive more packets in this stream, all packets received so far will be "'replayed" to the module in the order that they were originally received. The module receives a pointer to a packet and to a stream, both of which contain pointers to the previous layer (if any). The module is then able to walk back to all the previous packet layers and stream layers. Both the packets and streams can have properties attached to them. The pointers to previous layers can be used to query properties that other modules may have attached on the lower layers.

A function variable sent between the modules and the control engine 18 can be used to identify the first and last packets in a stream. It is important to identify when the end of the stream is reached so that the module can free any memory it has assigned to unneeded pointers.

After the data for each packet is received by a module, the module must notify the control engine 18 whether or not it wishes to continue to receive data from the stream. If a module notifies the control engine 18 that it no longer wishes data from the stream, the module decoding the next layer down will be notified by the control engine 18 and the module can choose to stop processing the lower layer. This can propagate all the way down the protocol stack, thereby saving processing time for data that will never be used.

One or more applications 30 can be included in the system 10. An application 30 is seen by the control engine 18 as simply another module and it must register with the control engine 18 in the same way. The difference between modules and applications is that the applications accept fully decoded objects, and are used to process the reconstructed data and/or store the data, in real-time, onto a data storage means 32 for later viewing.

In addition to identifying and extracting data within packets and streams, modules can also provide parameters to the control engine to be associated with a packet or stream and these are stored in memory in the control engine 18. For example, an IP module 24 can add the source and destination IP addresses to packets (which is read from the IP header) which can then be read by the TCP module 26, which requires the source and destination IP addresses as well as the TCP ports to associate packets into connections. By using these properties it is not necessary for the TCP module 26 to be able to understand an IP header.

If, at any stage in the decoding process, none of the protocol modules is registered for the identified protocol, or the registered protocol module rejects the data packet, the control engine 18 will systematically send pointers to the data packet 34 and location of the start of the next layer within the packet, to each of protocol modules in turn until either a module accepts the data, or until there are no more protocol modules to try. In one embodiment of the invention, the control engine 18 "learns" which modules accept the unclaimed protocols so that other data packets containing the same protocol are offered to the accepting module first.

In certain situations the data contained in a data packet may be compressed. When compressed data packets arrive at the control engine 18 they must be uncompressed before the decoding process can continue. For this purpose, certain modules are included in the system 10 which are arranged to decompress the compressed data packets. In order to enable later modules to read the decompressed data packets, it is necessary for the decompression modules to store the decompressed packets in a second packet buffer 20 within the control engine 18. From the decompression point onwards in the decoding process, the pointers to the data packet are directed to the decompressed packet stored in the second packet buffer 20 rather than the original packet buffer 16 located in the packet capture driver 14.

The above-mentioned type detection mechanism is only used for protocol streams (eg. HTTP streams, TCP streams) and not for object streams (eg. *.ZIP files, *.EXE files).

The control engine 18 uses its own protocol on object identifiers (ID's), in the form of 32 bit integers. The address space is divided in two, with one half used for protocol types such as IP, TCP, HTTP, etc. and the other half is used for object types such as HTML documents, images, text files, etc. The control engine 18 can distinguish between protocols and objects by checking whether the high bit (bit 31) is set or not. For protocol types the high bit is not set and for object types it is set. The control engine provides a set of macros for converting protocol numbers into control engine type ID's as well as maintaining a database of mime type and file extensions. Modules such as an HTTP module 28 which receive a mime type for each object transferred via the protocol can request that the control engine 18 converts the mime type to a control engine type ID. Similarly, modules such as an FTP module can request the conversion of file extensions for the objects they capture.

The control engine 18 can be arranged to perform automatic type detection of objects such as images and text documents by examining the captured and reformed data. By detecting the data type rather than relying on the file extension of the reformed object the system 10 can provide enhanced monitoring features, including being able to correctly identify objects that have been deliberately mislabelled in an attempt to hide their content.

Figure 3:
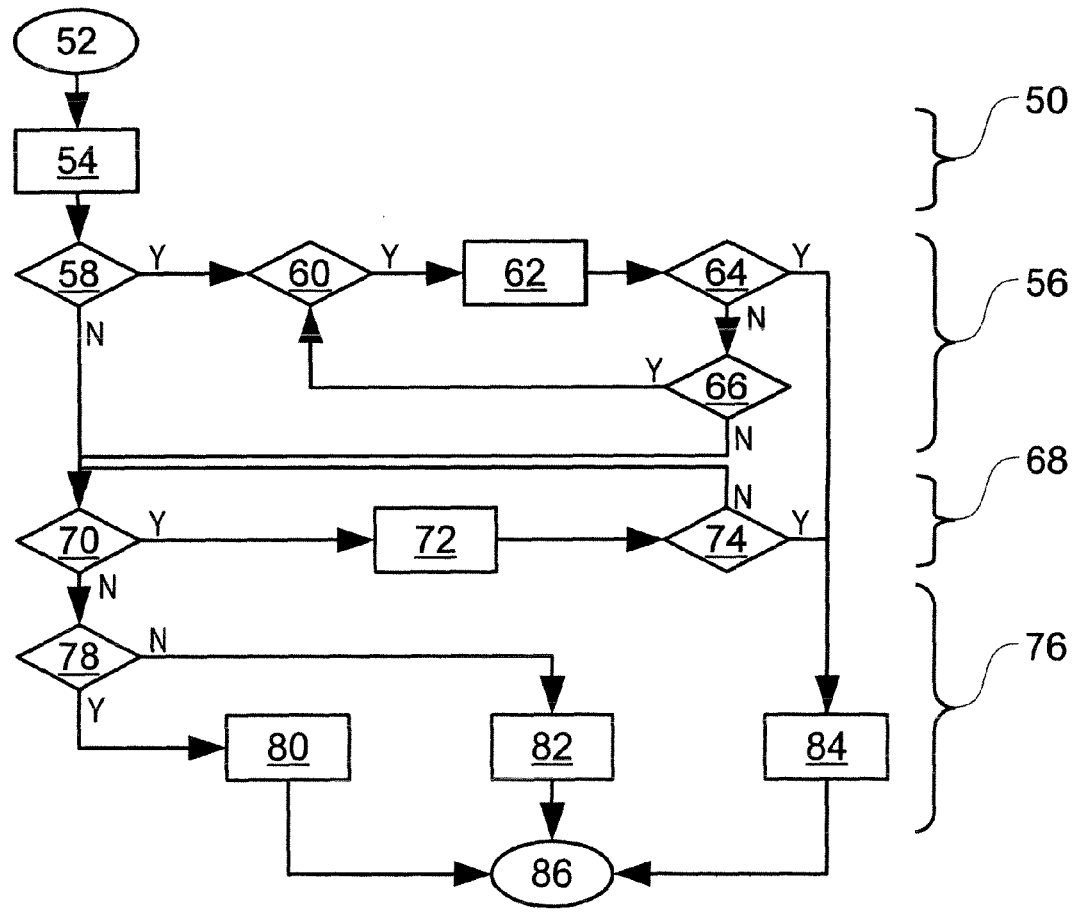
FIG. 3 is a flow diagram illustrating the method of the invention for detecting the file type of an electronic file.

FIG. 3 illustrates a system for automatic detection of the file type of a reconstructed file and shows a four stage detection process in the examination of captured data to determine its true data type.

At the first stage 50 of the detection process, the captured data 52 is passed through a type-trie data structure 54 to match the incoming data against all known data types in near constant time. This first stage 50 uses the fact that a large proportion of data types have a defined structure, and in particular many of these data types have a defined first N bytes of data at the start of each file which can be used as a file-type identifier. This section can be used to quickly create a list of one or more data types of which start with the same first N bytes as that of the captured data.

Figure 4:
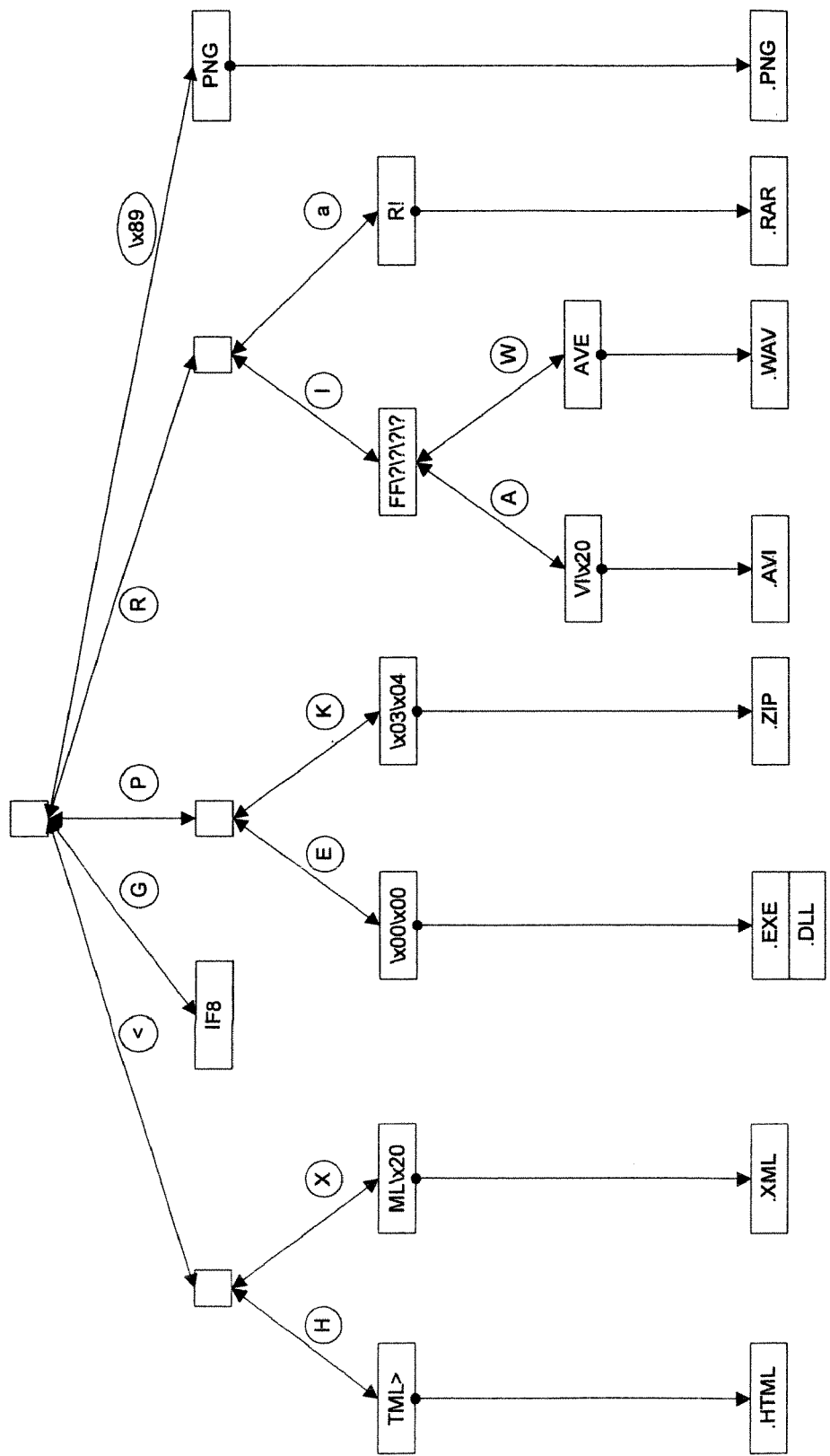
FIG. 4 illustrates a data structure showing one example of the method illustrated in FIG. 3.

FIG. 4 is a diagram showing an exemplary type-trie which can be used to identify the following types of data:

| Initial Bytes | File Types(s) |
|---|---|
| <HTML> | .HTML |
| <XML\x20 | .XML |
| GIF8 | .GIF |
| PE\x00\x00 | .EXE, .DLL |
| PK\x03\x04 | .ZIP |
| RIFF\?\?\?\?AVI\x20 | .AVI |
| RIFF\?\?\?\?WAVE | .WAV |
| Rar! | .RAR |
| \x89PNG | .PNG |

The type-trie data structure is similar to a patricia trie, with added support for wild-card characters. In a patricia trie, each node may have as many child nodes as there are characters in the alphabet (256 for an alphabet including all possible byte values). In a type-trie there may be one extra child for the wild-card character and each node contains a pointer to its parent node.

When matching data against a type-trie each node may offer two different paths to follow, one for the normal child node and one for the wild-card child. In this case the normal child is always visited in preference to the wild-card child.

If while performing the match a mismatch occurs then the parent node pointers are followed until a parent node is found that has a wild-card child. The wild-card child is then visited and the process is repeated until a match occurs or there are no more parent nodes with wild-card children.

Because not every data type can be uniquely identified by the first few bytes of data, further detection rules may be required to pinpoint the correct data type. The list of possible matching data types from the first stage 50 is inspected 58 in the second stage 56. If the data type list contains at least one data type, the control engine checks if the first data type has a detection rule 60. These detection rules can be more complex than simply looking at the first few bytes of the data as with the type-trie, for example the rule may check for components deeper within the data, or examine the structure of the data. If a detection rule is available for the listed possible data type, then the data is tested against the rule 62, and the control engine checks if there is a match 64. If the data does match the data type, the data type is set as the detected type 84 and the detection process is complete 86. If, on the other hand, the data does not match the tested data type, then the control engine checks if there are any more possible data types in the list 66, and if so goes back to the step of checking whether the data type has a detection rule 60. This process is repeated until either the data type is matched, or there are no more data types in the list to test.

If none of the possible data types in the list are correct, then, in the third stage 68 the control engine checks if there are any untried detection rules for data types not listed in the data type list 70. If other detection rules are available then the data is tested 72 against each rule in turn, checking for matches 74 after each test.

If, after every available detection rule has been tried, no match has been found, then the file type is set to "unknown" at 82 and the detection process is complete at 86. It is possible to check for a file extension in the data 78, in stage four at 76 but if a recognizable type of file extension is found in the data at this stage then it cannot be the declared type and so the file type is marked "unknown". If an unrecognizable file type is revealed by the extension then the file type for the data is set to that type at 80 and the detection process is complete at 86. If no file extension can be located in the data, then the file type is in any case set to "unknown" at 82 and the detection process is complete 86.

The composition of the detection rules depends of course upon the nature of the data. They will preferably be defined using a special purpose language and one example for matching Microsoft Word documents might be:

[({48:4}*(1<<{30:2}))+(2*128)]="Word Document"

This rule reads the 2 byte sector size from offset 30 and shifts 1 by that value (i.e. it calculates 2 to the power of the sector size). It then reads the 4 byte directory sector number from offset 48, multiplies the sector number by the sector size, adds two times the size of a directory entry, and compares the string at the resulting location with "Word Document".

The detection rules are preferably compiled into an intermediate state that can be quickly interpreted to test them against incoming data.

The invention claimed is:

1. A method for detecting a file type, the method comprising the steps of:
    evaluating a predetermined number of bytes at a beginning of a file to create a list of probable file types, wherein evaluating comprises passing the predetermined number of bytes at the beginning of the file through a type-trie data structure by comparing each byte of the predetermined number of bytes with a node of the type-trie data structure;
    testing the file against a detection rule for each file type in the list until a match is found; and
    when no match is found, testing the file against other known detection rules for file types that are not included in the list to find a match.

2. A method as claimed in claim 1, wherein each node of the type-trie data structure comprises a first path for a child node and a second path for a wild-card child.

3. A method as claimed in claim 2, wherein the file is passed through the first path prior to being passed through the second path.

4. A method according to claim 1, wherein the detection rule for each file type in the list comprises examining a structure of the file.

5. A method according to claim 1, further comprising setting the file type to "unknown" if no match is found after testing the file against the other known detection rules for the file types that are not included in the list.

6. A method according to claim 1, further comprising, when no match is found after testing the file against the other known detection rules for the file types that are not included in the list, checking the file for a file extension and marking the file type as "unknown" when a recognizable type of file extension is found and when no file extension is found.

7. A method according to claim 6, further comprising, when an unrecognizable type of file extension is found, setting the file type corresponding to that unrecognizable file extension.

8. A method according to claim 1, wherein the detection rules are compiled into an intermediate state such that the detection rules can be quickly interpreted for testing.

9. A computer program product embodied on a non-transitory computer-readable medium, comprising instructions stored thereon to cause a processing device to:
   evaluate a predetermined number of bytes at a beginning of a file to create a list of probable file types, wherein the instructions to evaluate comprise instructions to pass the predetermined number of bytes at the beginning of the file through a type-trie data structure by comparing each byte of the predetermined number of bytes with a node of the type-trie data structure;
   test the file against a detection rule for each file type in the list until a match is found; and
   when no match is found, test the file against other known detection rules for file types that are not included in the list to find a match.

10. A computer system, comprising:
    a memory;
    one or more network adapters; and
    a processing device communicatively coupled to the memory and configured to execute instructions stored in the memory to cause the processing device to:
    capture data from network traffic communicated via the one or more network adapters;
    evaluate a predetermined number of bytes at a beginning of the data to create a list of probable file types, wherein the instructions to evaluate comprise instructions to pass the predetermined number of bytes at the beginning of the file through a type-trie data structure by comparing each byte of the predetermined number of bytes with a node of the type-trie data structure;
    test the data against a detection rule for each file type in the list to find a match; and
    when no match is found, test the data against other known detection rules for file types that are not included in the list to find a match.

11. A system according to claim 10, wherein each node of the type-trie data structure comprises a first path for a child node and a second path for a wild-card child.

12. A system according to claim 11, wherein the data is passed through the first path prior to being passed through the second path.

* * * * *